United States Patent
Goto et al.

(10) Patent No.: US 8,857,187 B2
(45) Date of Patent: Oct. 14, 2014

(54) STEAM TURBINE PLANT

(75) Inventors: Koichi Goto, Yokohama (JP); Nobuo Okita, Ushiku (JP)

(73) Assignee: Kabushiki Kaisha Tosiba, Tokyo (JP)

( * ) Notice: Subject to any disclaimer, the term of this patent is extended or adjusted under 35 U.S.C. 154(b) by 428 days.

(21) Appl. No.: 13/081,293

(22) Filed: Apr. 6, 2011

(65) Prior Publication Data

US 2011/0247329 A1 Oct. 13, 2011

(30) Foreign Application Priority Data

Apr. 7, 2010 (JP) ................................. 2010-088651

(51) Int. Cl.
| | | |
|---|---|---|
| *F01K 7/22* | (2006.01) | |
| *F01K 7/34* | (2006.01) | |
| *F03G 6/00* | (2006.01) | |
| *F03G 7/00* | (2006.01) | |
| *F01K 7/18* | (2006.01) | |
| *F22B 1/00* | (2006.01) | |
| *F03G 6/06* | (2006.01) | |

(52) U.S. Cl.
CPC . *F01K 7/18* (2013.01); *F03G 6/065* (2013.01); *F03G 6/005* (2013.01); *F01K 7/22* (2013.01); *F22B 1/006* (2013.01); *Y02E 10/46* (2013.01)
USPC ............ 60/679; 60/653; 60/641.8; 60/641.15

(58) Field of Classification Search
CPC ........... F01K 7/22; Y02E 20/16; Y02E 20/14; Y02E 10/46; Y02E 10/10; Y02E 20/12; Y02E 20/18; Y02E 20/344; Y02E 30/40; Y02E 10/34; Y02E 30/39; Y02E 30/31; Y02E 50/30; Y02E 10/14; Y02E 10/722; Y02E 10/725; Y02E 10/726; Y02E 20/346; Y02E 20/363; Y02E 30/10; Y02E 30/33; Y02E 30/36; Y02E 30/38; Y02E 50/14; Y02E 50/17; Y02E 60/15

USPC ............................ 60/641.8–641.15, 645–681
See application file for complete search history.

(56) References Cited

U.S. PATENT DOCUMENTS 2,064,444 A * 12/1936 Mosshart et al. ............. 122/480
4,117,682 A * 10/1978 Smith .......................... 60/641.8

(Continued)

FOREIGN PATENT DOCUMENTS

| DE | 101 28 562 C1 | 1/2003 |
|---|---|---|
| EP | 1 028 233 B1 | 8/2000 |

(Continued)

OTHER PUBLICATIONS

U.S. Appl. No. 13/081,296, filed Apr. 6, 2011, Goto.

(Continued)

*Primary Examiner* — Christopher Jettow
(74) *Attorney, Agent, or Firm* — Foley & Lardner LLP

(57) ABSTRACT

A steam turbine plant of one embodiment includes a solar energy collector configured to collect solar heat, a boiler configured to change water into steam by the solar heat, a high pressure turbine including a turbine or turbines connected to each other in series, and configured to be driven by the steam from the boiler, first to N-th reheaters, where N is an integer of two or more, and first to N-th reheat turbines, wherein the first reheater is configured to heat the steam exhausted from the high pressure turbine by the solar heat, and the first reheat turbine is configured to be driven by the steam from the first reheater, and the second to N-th reheaters are configured to heat the steam exhausted from the first to (N−1)-th reheat turbines by the solar heat, respectively, and the second to N-th reheat turbines are configured to be driven by the steam from the second to the N-th reheaters, respectively.

6 Claims, 4 Drawing Sheets

(56) References Cited

U.S. PATENT DOCUMENTS

| | | |
|---|---|---|
| 4,343,999 A | 8/1982 | Wolf |
| 4,364,999 A | 12/1982 | Motohashi |
| 4,387,576 A | 6/1983 | Bissell |
| 4,433,545 A | 2/1984 | Chang |
| 4,476,853 A | 10/1984 | Arbogast |
| 4,873,827 A | 10/1989 | Hadano et al. |
| 5,775,091 A | 7/1998 | Bannister et al. |
| 5,873,238 A | 2/1999 | Bellows |
| 5,925,223 A | 7/1999 | Simpson et al. |
| 6,442,924 B1 | 9/2002 | Talley et al. |
| 2004/0261417 A1 | 12/2004 | Yamashita |
| 2005/0279095 A1 | 12/2005 | Goldman |
| 2010/0175365 A1 | 7/2010 | Ota |
| 2010/0212318 A1* | 8/2010 | Schaal ........................ 60/641.15 |

FOREIGN PATENT DOCUMENTS

| | | |
|---|---|---|
| EP | 2 187 051 A1 | 5/2010 |
| JP | 60-180703 U | 11/1985 |
| JP | 02-140404 A | 5/1990 |
| JP | 2003-074309 A | 3/2003 |
| JP | 2008-039367 A | 2/2008 |
| JP | 2008-121483 A | 5/2008 |
| WO | WO 98/17897 A1 | 4/1998 |
| WO | WO 2009/034577 A2 | 3/2009 |

OTHER PUBLICATIONS

U.S. Appl. No. 13/081,300, filed Apr. 6, 2011, Goto.
K. Goto, U.S. PTO Office Action, U.S. Appl. No. 13/081,296, dated Feb. 22, 2013, 12 pages.
K. Goto, U.S. PTO Office Action, U.S. Appl. No. 13/081,296, dated Aug. 14, 2013, 10 pages.
K. Goto, U.S. PTO Office Action, U.S. Appl. No. 13/081,300, dated Feb. 21, 2014, 16 pages.
Japanese Office Action dated Nov. 1, 2013 issued in connection with counterpart of U.S. Appl. No. 13/081,296.
Japanese Office Action dated Nov. 1, 2013 issued in connection with counterpart of U.S. Appl. No. 13/081,300.
K. Goto, U.S. PTO Official Action, U.S. Appl. No. 13/081,296, dated Apr. 9, 2014, 13 pages.
K. Goto, U.S. PTO Notice of Allowance and Allowability, U.S. Appl. No. 13/081,300, dated Jun. 17, 2014, 7 pages.

\* cited by examiner

PRIOR ART

025 # STEAM TURBINE PLANT

CROSS REFERENCE TO RELATED APPLICATION

This application is based upon and claims the benefit of priority from the prior Japanese Patent Application No. 2010-88651, filed on Apr. 7, 2010, the entire contents of which are incorporated herein by reference.

BACKGROUND OF THE INVENTION

1. Field of the Invention

The present invention relates to a steam turbine plant, for example, using solar heat.

2. Background Art

FIG. 5 is a schematic diagram illustrating an example of a conventional steam turbine plant using solar heat. A steam turbine cycle of the plant of FIG. 5 will be described.

A heating medium 118 is transferred to a solar energy collector 119 collecting solar heat by a heating medium pump 116. The heating medium 118 is, for example, oil. The heating medium 118 is heated by radiant heat of a solar ray 117 at the solar energy collector 119. Subsequently, the heating medium 118 is transferred to a heater 110 as a heat exchanger, and a heating object such as water or steam is heated therein. The temperature of the heating medium 118 decreases at the heater 110, and returns to the upstream of the heating medium pump 116. In this way, the heating medium 118 circulates.

In the nighttime when the solar ray 117 may not be received or in the weather of daytime when the solar ray 117 is weak, the heating medium 118 accumulated in a heat accumulating tank is circulated or the heating medium 118 is circulated to a line heated by an auxiliary boiler. However, the devices or the flow thereof are not shown herein. Meanwhile, in this case, the heating medium 118 bypasses the solar energy collector 119.

As the solar energy collector 119, various types may be used, but a trough condensing type shown in FIG. 8 is used in many cases. FIG. 8 is a schematic diagram illustrating an example of the trough condensing type solar energy collector 119. The solar energy collector 119 of FIG. 8 condenses the solar ray 117 by a collector mirror 123 and heats a solar energy collection pipe 124. The heating medium 118 circulates in the solar energy collection pipe 124, and the temperature of the heating medium 118 increases by radiant heat transmitted from the solar ray 117 to the solar energy collection pipe 124. The upstream and the downstream of the solar energy collection pipe 124 are respectively connected to heating medium pipes 125. Although the solar energy collection pipe 124 is made by the careful examination, the pipe will not be described herein in detail.

Hereinafter, returning to FIG. 5, the description of the steam turbine plant will be continued.

In many cases, the conventional steam turbine cycle is configured as a single-stage reheating cycle that includes a high pressure turbine 101 and a reheat turbine. An intermediate pressure turbine 102 and a low pressure turbine 103 are treated as a continuous reheat turbine 113.

The heater 110 includes a boiler 108 which changes water 111 into steam 112 by the heat of the heating medium 118, and a reheater 109 which heats steam for the reheat turbine 113. The water 111 is transferred to the boiler 108 as a part of the heater 110 by the pump 105, and is heated by the boiler 108 so that the water changes into high pressure turbine inlet steam 112. In FIG. 5, the inlet at the most upstream of the high pressure turbine 101 is denoted by the symbol X.

The high pressure turbine inlet steam 112 flows into the high pressure turbine 101 and expands inside the high pressure turbine 101 so that the pressure and the temperature thereof decrease. The high pressure turbine 101 is driven by the high pressure turbine inlet steam 112. In the steam turbine cycle using solar heat, the temperature of the high pressure turbine inlet steam 112 is lower than that of the steam turbine cycle using heat of combusted exhaust gas of fuel in many cases. For this reason, the high pressure turbine exhaust 114 is not all dry steam as gas, but is partly mixed with a liquid. That is, it is humid steam in which the dryness degree is less than 1.

In FIG. 5, a high pressure turbine steam outlet (an exhaust port) located at the most downstream of the high pressure turbine 101 is denoted by the symbol Y. The high pressure turbine exhaust 114 flows into the reheater 109 as a part of the heater 110, is heated by the heat of the heating medium 118, and flows into the intermediate pressure turbine 102.

Intermediate pressure turbine inlet steam 106 expands inside the intermediate pressure turbine 102 so that the pressure and the temperature thereof both decrease and flows into the low pressure turbine 103. The steam flowing into the low pressure turbine 103 expands inside the low pressure turbine 103 so that the pressure and the temperature both decrease and the steam flows to the outside as humid steam. In this way, the intermediate pressure turbine 102 and the low pressure turbine 103 are driven as well as the high pressure turbine 101.

The steam flowing from the low pressure turbine 103, that is, low pressure turbine exhaust 115 flows into a condenser 104. In the condenser 104, the low pressure turbine exhaust 115 is cooled by cooling water, and is returned to the water 111. The water 111 returns to the upstream of the pump 105. In this way, the water 111 and the steam 112 circulate. Meanwhile, seawater or stream water may be used as the cooling water, the water warmed at the condenser 104 may be cooled at a cooling tower using atmosphere, and the cooled water may be circulated.

The rotation shafts of the high pressure turbine 101, the intermediate pressure turbine 102, and the low pressure turbine 103 are connected to a power generator 107. The rotation shafts thereof are rotated as the high pressure turbine 101, the intermediate pressure turbine 102, and the low pressure turbine 103 are rotated by the expanding steam. By the rotation of the rotation shafts, power is generated in the power generator 107.

FIG. 6 is a schematic diagram illustrating another example of the conventional steam turbine plant using solar heat.

In FIG. 6, extraction steam 120 is extracted from one or more turbines among the high pressure turbine 101, the intermediate pressure turbine 102, and the low pressure turbine 103. A feed-water heater 121 using the extraction steam 120 as a heat source is provided between the condenser 104 and the boiler 108, and the water 111 is heated at the feed-water heater 121. In FIG. 6, the extraction port of the high pressure turbine 101 is denoted by the symbol Z. The number of the feed-water heaters 121 may be one or more (three heaters are shown in FIG. 6), and the extraction steam 120 may be supplied from one turbine to the plurality of feed-water heaters 121.

Likewise, the steam turbine cycle of the plant of FIG. 6 includes the reheating cycle and the reheat regeneration cycle as a regeneration cycle, and the conventional steam turbine cycle has that configuration in many cases. The cycle efficiency is improved by the effect of the regeneration cycle. The extraction steam 120 is cooled at the feed-water heater 121 so that the steam changes into water and is merged with the water 111 at a drain water pump 122. Meanwhile, in FIG. 6, the description of the flow of the heating medium 118 is omitted.

FIG. 7 is a diagram illustrating an example of an expansion line of the conventional steam turbine plant shown in FIG. 5 or 6. In FIG. 7, the vertical axis indicates specific enthalpy, and the horizontal axis indicates specific entropy.

In FIG. 7, a high pressure turbine expansion line 201, a reheat turbine expansion line 202, and a saturation line 203 are shown. Since the intermediate pressure turbine 102 and the low pressure turbine 103 are the continuous reheat turbine, the expansion line related to the turbine is one expansion line.

In FIG. 7, a high pressure turbine inlet point 204, a high pressure turbine outlet point 205, a reheat turbine inlet point (an intermediate pressure turbine inlet point) 206, and a reheat turbine outlet point (a low pressure turbine outlet point) 207 are shown.

In FIG. 7, the high pressure turbine exhaust 114 is heated at the reheater 109 up to a temperature equal to that of the high pressure turbine inlet steam 112. Further, in FIG. 7, when the steam changes from the high pressure turbine inlet point 204 to the high pressure turbine outlet point 205 or changes from the reheat turbine inlet point 206 to the reheat turbine outlet point 207, the steam changes more than the saturation line 203. Therefore, the steam is dry steam at the high pressure turbine inlet point 204 or the reheat turbine inlet point 206, and the steam is humid steam at the high pressure turbine outlet point 205 or the reheat turbine outlet point 207.

Meanwhile, JP-A 2008-39367 (KOKAI) describes an example of a solar power generation facility that includes a solar energy collection device heating a liquid thermal medium by the solar ray.

SUMMARY OF THE INVENTION

In a reheating cycle using solar heat, a large amount of the high pressure turbine inlet steam 112 is close to the humid region in the diagrammatic drawing of specific enthalpy-specific entropy, and a large amount of the high pressure turbine exhaust 114 becomes humid steam. The high pressure turbine inlet steam 112 has, for example, a pressure of 100 ata and a temperature of 380° C. At this time, a difference between the temperature of the steam at the inlet of the high pressure turbine 101 and the saturation temperature of the pressure of the steam at the inlet of the high pressure turbine 101 is about 70° C. The humid steam inside the high pressure turbine 101 causes moisture loss, and degrades the turbine internal efficiency. Further, since minute water drops collide with the surface of the turbine blade, erosion may be generated.

Further, since the steam flowing into the reheater 109 to become the intermediate pressure turbine inlet steam 106, that is, the high pressure turbine exhaust 114 is humid steam, specific enthalpy may not be specified even when the pressure or the temperature of the steam is measured. The specific enthalpy may be specified when the humidity degree of the steam is measured, but it is difficult to measure the humidity degree with high precision and simplicity. Therefore, since the amount of heat input from the heater 110 to the turbine cycle may not be specified, the thermal efficiency of the turbine cycle may not be recognized. Further, since the high pressure turbine exhaust 114 and the low pressure turbine exhaust 115 are both humid steam at the same time, the turbine internal efficiency thereof may not be specified.

Therefore, there is a demand for a steam turbine plant in which the steam other than in the vicinity of the outlet of the low pressure turbine 103 is not humid steam.

An aspect of the present invention is, for example, a steam turbine plant including a solar energy collector configured to collect solar heat, a boiler configured to change water into steam by the solar heat, a high pressure turbine including a turbine or turbines connected to each other in series, and configured to be driven by the steam from the boiler, first to N-th reheaters, where N is an integer of two or more, and first to N-th reheat turbines, wherein the first reheater is configured to heat the steam exhausted from the high pressure turbine by the solar heat, and the first reheat turbine is configured to be driven by the steam from the first reheater, and the second to N-th reheaters are configured to heat the steam exhausted from the first to (N−1)-th reheat turbines by the solar heat, respectively, and the second to N-th reheat turbines are configured to be driven by the steam from the second to the N-th reheaters, respectively.

DESCRIPTION OF THE EMBODIMENTS

Embodiments of the invention will now be explained with reference to the accompanying drawings.

First Embodiment

Figure 1:
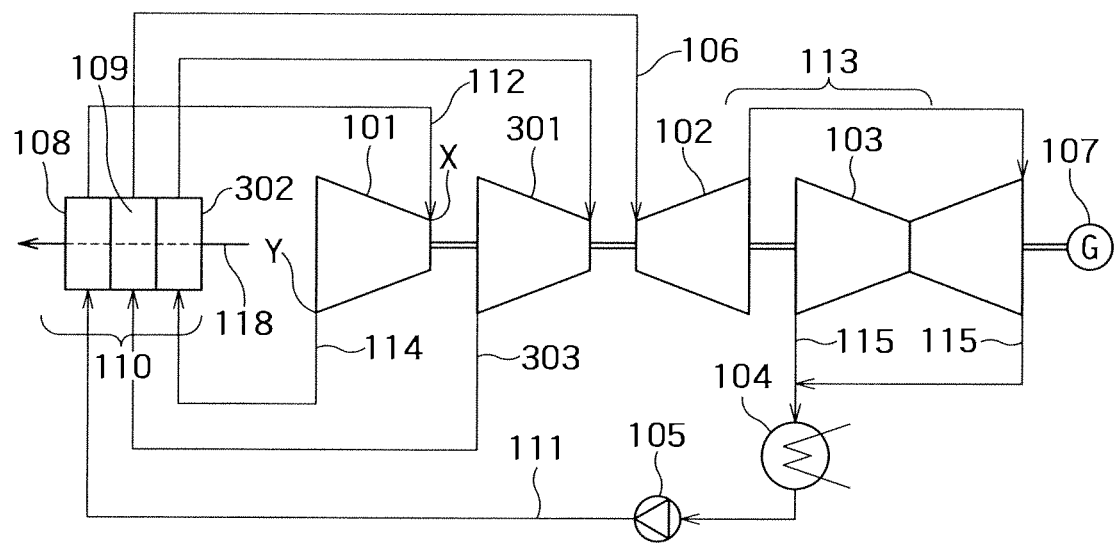
FIG. 1 is a schematic diagram illustrating a configuration of a steam turbine plant of a first embodiment.

FIG. 1 is a schematic diagram illustrating a configuration of a steam turbine plant of a first embodiment. As for the configuration shown in FIG. 1, the differences from the configuration shown in FIG. 5 will be mainly described.

In the embodiment, at least a two-stage reheating cycle is configured by using a steam turbine that is driven by steam generated by solar heat. In the embodiment, the reheating cycle is configured as a two-stage reheating cycle that includes a high pressure turbine 101, a reheat turbine 301, and a reheat turbine 113. Hereinafter, the reheat turbine 301 is referred to as a first reheat turbine, and the reheat turbine 113 is referred to as a second reheat turbine. An intermediate pressure turbine 102 and a low pressure turbine 103 correspond to a continuous reheat turbine 113.

A heater 110 includes a boiler 108 which changes water 111 into steam 112 by heat of a heating medium 118, a reheater (hereinafter, referred to as a "first reheater") 302 which heats steam for the first reheat turbine 301, and a reheater (hereinafter, referred to as a "second reheater") 109 which heats steam for the second reheat turbine 113. The water 111 is transferred to the boiler 108 by a pump 105 and is heated at the boiler 108 so that the water changes into high pressure turbine inlet steam 112. In FIG. 1, the inlet located at the most upstream of the high pressure turbine 101 is denoted by the symbol X.

The high pressure turbine inlet steam 112 flows into the high pressure turbine 101 and expands inside the high pressure turbine 101 so that the pressure and the temperature thereof decrease. Accordingly, in the conventional high pressure turbine 101, the steam inside the turbine changes from dry steam into humid steam. However, in the embodiment, since at least the two-stage reheat turbine is configured, the number of turbine stages of the high pressure turbine 101 in the axis direction of the turbine is smaller than that of the conventional high pressure turbine 101. Accordingly, the dry steam may be prevented from changing into the humid steam. In the embodiment, the steam inside the high pressure turbine 101 is maintained as dry steam, and the number of stages of the high pressure turbine 101 is set so that the dry steam does not change into the humid steam.

Therefore, in the embodiment, high pressure turbine exhaust 114 becomes dry steam. In FIG. 1, a high pressure turbine steam outlet (an exhaust port) located at the most downstream of the high pressure turbine 101 is denoted by the symbol Y. The high pressure turbine exhaust 114 flows into the first reheater 302, is heated by heat of the heating medium 118, and flows into the first reheat turbine 301.

The steam flowing into the first reheat turbine 301 expands inside the first reheat turbine 301 so that the pressure and the temperature thereof decrease. The first reheat turbine 301 is driven by the steam. First reheat turbine exhaust 303 is dry steam and flows into the intermediate pressure turbine 102. In the embodiment, as well as the high pressure turbine 101, the number of stages of the first reheat turbine 301 is set so that the steam inside the first reheat turbine 301 is maintained as dry steam without changing into humid steam.

The steam flowing into the intermediate pressure turbine 102 expands inside the intermediate pressure turbine 102 so that the pressure and the temperature thereof decrease and the steam flows in the low pressure turbine 103. The steam flowing into the low pressure turbine 103 expands inside the low pressure turbine 103 so that the pressure and the temperature thereof decrease and the steam flows to the outside as humid steam. The rotation shafts of the high pressure turbine 101, the first reheat turbine 301, the intermediate pressure turbine 102, and the low pressure turbine 103 rotated by the expanding steam are connected to a power generator 107, and the power generator 107 generates power with the rotation of the rotation shafts.

Figure 6:
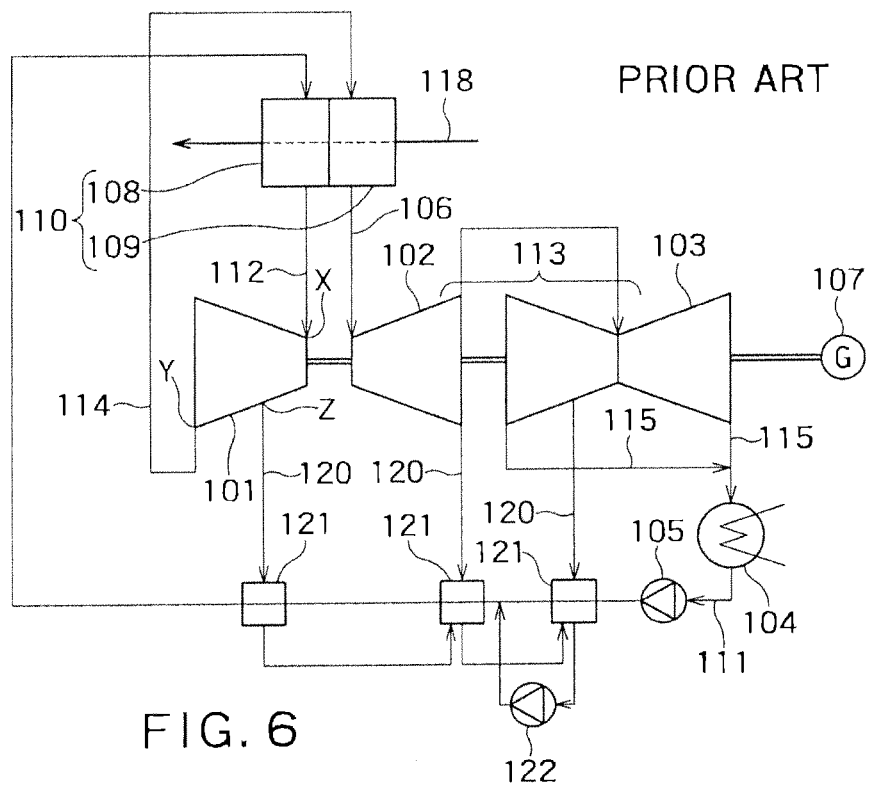
FIG. 6 is a schematic diagram illustrating another example of the conventional steam turbine plant.
Figure 7:
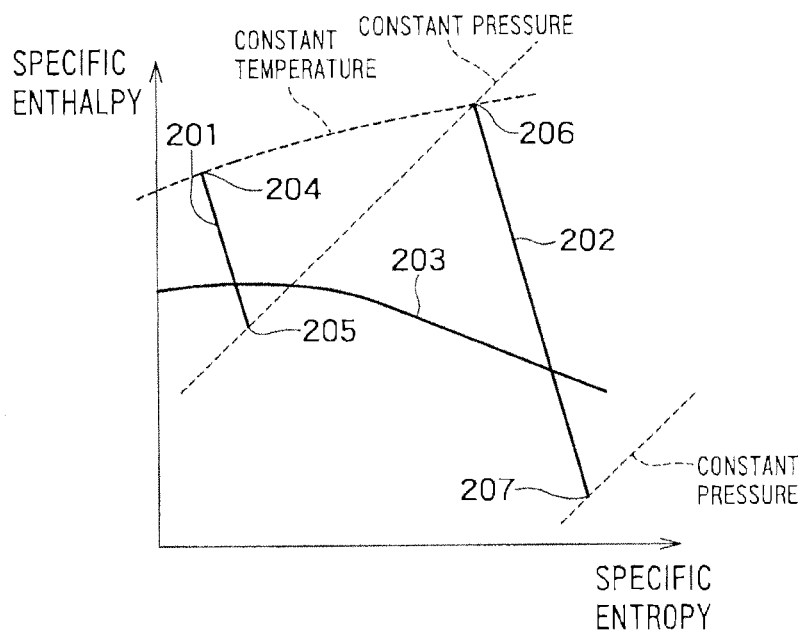
FIG. 7 is a diagram illustrating an example of an expansion line of the conventional steam turbine plant.

Meanwhile, in the embodiment, as shown in FIG. 6, a reheat regeneration cycle may be configured in a manner such that extraction steam 120 is extracted from the middle position of one or more turbines among the high pressure turbine 101, the first reheat turbine 301, the intermediate pressure turbine 102, and the low pressure turbine 103, and the water 111 is heated at a feed-water heater 121 by using the extraction steam 120. Further, the extraction steam 120 may be supplied from one turbine to a plurality of feed-water heaters 121.

Meanwhile, in FIG. 1, the turbine located at the upstream side of the first reheater 302 is only one turbine (the high pressure turbine 101). However, a plurality of turbines may be disposed to be connected to each other in series at the upstream side of the first reheater 302, and the plurality of turbines connected to each other in series may constitute the high pressure turbine.

Figure 2:
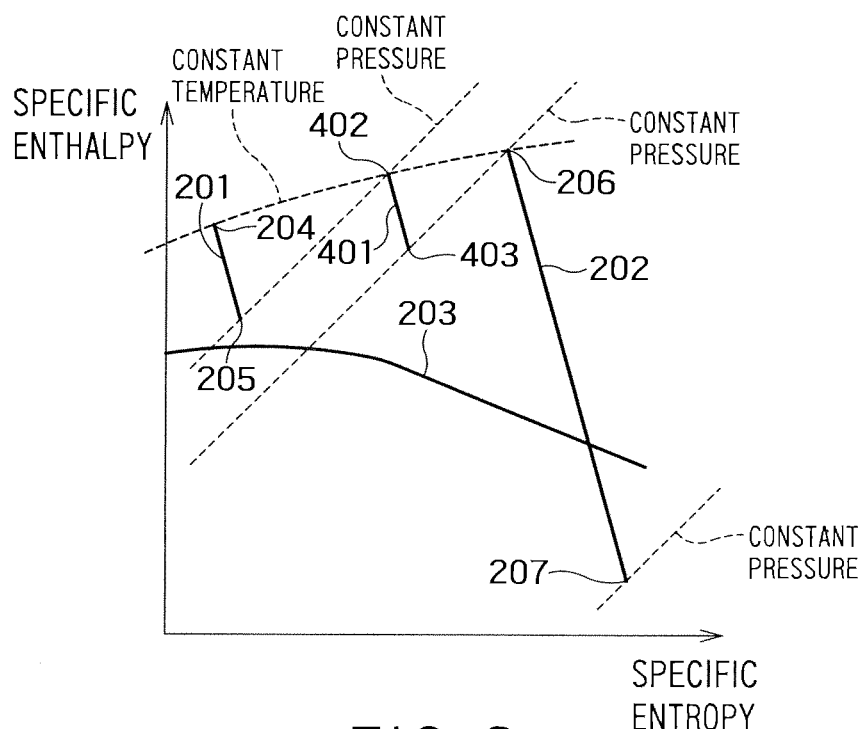
FIG. 2 is a diagram illustrating an example of an expansion line of the steam turbine plant shown in FIG. 1.

FIG. 2 is a diagram illustrating an example of an expansion line of the steam turbine plant shown in FIG. 1.

In FIG. 2, the high pressure turbine exhaust 114 and the first reheat turbine exhaust 303 are respectively heated at the first reheater 302 and the second reheater 109 up to a temperature equal to the temperature of the high pressure turbine inlet steam 112. A first reheat turbine expansion line 401 changes from a first reheat turbine inlet point 402 to a first reheat turbine outlet point 403.

A high pressure turbine expansion line 201 and the first reheat turbine expansion line 401 change not to exceed a saturation line 203, and high pressure turbine exhaust 114 and the first reheat turbine exhaust 303 become dry steam. Therefore, only low pressure turbine exhaust 115 among the exhaust at three points shown in FIG. 2 becomes humid steam, and the other exhaust becomes dry steam.

In the embodiment, in the steam turbine plant driven by steam generated by solar heat, a steam turbine cycle is realized in which the steam other than in the vicinity of the outlet of the low pressure turbine 103 is not humid steam without changing the status and the property of the steam at the inlets of the high pressure turbine 101 and the first reheat turbine 301. Therefore, humid steam is not present other than in the vicinity of the outlet of the low pressure turbine 103. Accordingly, a degradation of the turbine internal efficiency caused by moisture loss may be prevented, and the turbine cycle performance may be improved. Further, there is no possibility of generating of erosion caused by minute water drops colliding with the surface of the turbine blade other than the vicinity of the outlet of the low pressure turbine 103. Further, in the embodiment, since the single-stage reheating cycle is also configured as the multi-stage reheating cycle, the turbine cycle performance is improved.

Further, since the high pressure turbine exhaust 114 or the first reheat turbine exhaust 303 is dry steam, specific enthalpy may be specified by measuring the pressure and the temperature thereof. Therefore, the amount of heat input from the heater 110 to the turbine cycle may be specified, and the thermal efficiency of the turbine cycle may be recognized. Further, since the turbine of which exhaust is humid steam is only the low pressure turbine 103, the internal efficiency of each turbine may be specified.

If a single-stage reheating cycle is provided in which the number of turbine stages of the first reheat turbine 301 increases and the second reheat turbine 113 is removed, moisture loss until reaching the pressure of the condenser 104 increases so that the turbine cycle performance becomes lower than that in any one of the embodiment and the related art.

Hereinafter, various modifications of the embodiment will be described.

(Trough Condensing Type Solar Energy Collector)

Figure 8:
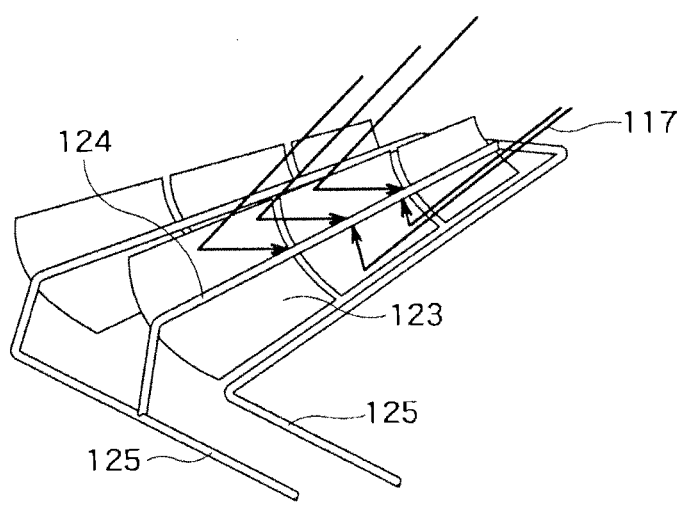
FIG. 8 is a schematic diagram illustrating an example of a trough condensing type solar energy collector.

In the embodiment, a solar energy collector 119 (refer to FIG. 5), for example, a trough condensing type shown in FIG. 8 is used. In this case, the trough condensing type solar energy collector 119 may be used in combination with a reheat regeneration cycle shown in FIG. 6.

Due to the actual temperature raising capacity in the condensing type and the heatproof temperature of oil used as the heating medium 118, the produced high pressure turbine inlet steam 112 has, for example, a pressure of 100 ata and a temperature of 380° C. Then, the high pressure turbine inlet steam 112 is sufficiently close to the humid region in the diagrammatic drawing of specific enthalpy-specific entropy. Therefore, in the trough condensing type, there is a high possibility that the high pressure turbine exhaust 114 becomes humid steam. For this reason, the configuration of the embodiment in which at least the two-stage reheat turbine is configured is useful in the case of using the trough condensing type.

(High Pressure Turbine Inlet Steam Condition 1)

In the embodiment, for example, a difference between the temperature of the steam at the inlet of the high pressure turbine 101 as the turbine at the most upstream side and the saturation temperature of the pressure of the steam at the inlet of the high pressure turbine 101 is set to be 100° C. or less, and in this condition, at least the two-stage reheating cycle is configured. When a difference in temperature is 100° C. or less, the high pressure turbine inlet steam 112 is sufficiently close to the humid region in the diagrammatic drawing of specific enthalpy-specific entropy. This condition may be applied in combination with the reheat regeneration cycle shown in FIG. 6.

The above-described condition may be applied to not only the steam turbine cycle using solar heat, but also the cycle in which the high pressure turbine inlet steam 112 is sufficiently close to the humid region in the diagrammatic drawing of specific enthalpy-specific entropy, and the same effect as that of the case of using solar heat may be obtained. Therefore, the turbine may be configured as a thermal power turbine using a combusted exhaust gas as a heat source, and in this case, the heating medium 118 is a combusted exhaust gas.

In a nuclear turbine, the high pressure turbine inlet steam 112 is humid steam in many cases. When the above-described condition is applied to this turbine, the turbine stage is not removed in which the steam inside the high pressure turbine 101 becomes humid steam. Further, even inside the first reheat turbine 301, there are many turbine stages in which the steam becomes humid steam.

However, in the entire turbine cycle, the number of turbine stages in which the steam becomes humid steam decreases. Therefore, according to the above-described condition, a degradation of the turbine internal efficiency caused by moisture loss is reduced so that the turbine cycle performance is improved. Further, the possibility of generating of erosion caused by minute water drops colliding with the surface of the turbine blade decreases. Since the single-stage reheating cycle is also configured as the multi-stage reheating cycle, the turbine cycle performance is improved.

Figure 5:
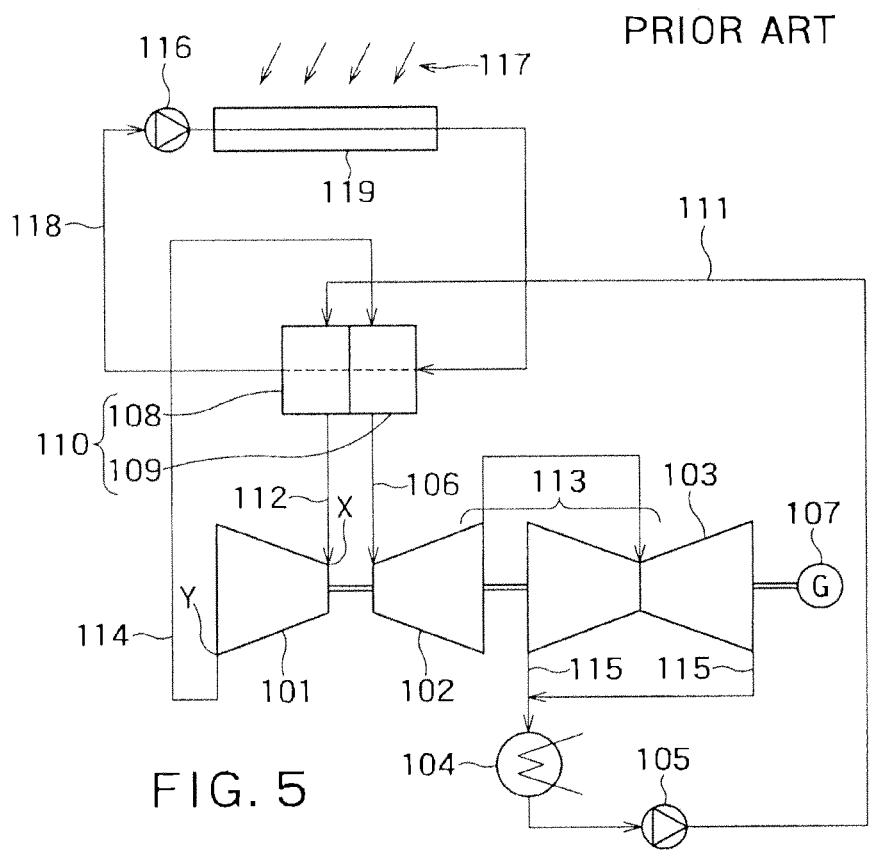
FIG. 5 is a schematic diagram illustrating an example of a conventional steam turbine plant.

Meanwhile, in the nuclear turbine, the flow of the heating medium 118 in the heater 110 is different from the flow shown in FIG. 5 in many points.

Further, in the case where a plurality of turbines is disposed to be connected to each other in series at the upstream of the first reheater 302, the turbine at the most upstream side among these turbines becomes the turbine at the most upstream side constituting the steam turbine plant of FIG. 1.

(High Pressure Turbine Inlet Steam Condition 2)

In the embodiment, for example, the steam at the inlet of the high pressure turbine 101 as the turbine at the most upstream side has a pressure of 20 ata or more and a temperature of 420° C. or less, and in this condition, at least the two-stage reheating cycle is configured. In the case where the steam at the inlet of the high pressure turbine 101 has a pressure of 20 ata or more and a temperature of 420° C. or less, the high pressure turbine inlet steam 112 is sufficiently close to the humid region in the diagrammatic drawing of specific enthalpy-specific entropy. This condition may be applied in combination with the reheat regeneration cycle shown in FIG. 6.

The above-described condition may be applied to not only the steam turbine cycle using solar heat, but also the cycle in which the high pressure turbine inlet steam 112 is sufficiently close to the humid region in the diagrammatic drawing of specific enthalpy-specific entropy. The steam turbine may be configured as a thermal power turbine using a combusted exhaust gas as a heat source or a nuclear turbine, and the same effect as that of the case of using solar heat may be obtained.

Meanwhile, in the nuclear turbine, the flow of the heating medium 118 in the heater 110 is different from the flow shown in FIG. 5 in many points.

Further, in the case where a plurality of turbines is disposed to be connected to each other in series at the upstream of the first reheater 302, the turbine at the most upstream side among these turbines becomes the most upstream side turbine constituting the steam turbine plant of FIG. 1.

(Steam Turbine Cycle)

The steam turbine plant of the embodiment includes four turbines in total, that is, the high pressure turbine 101 as the turbine at the most upstream side, the first reheat turbine 301, the intermediate pressure turbine 102, and the low pressure turbine 103 as the turbine at the most downstream side.

In the embodiment, it is desirable that the turbine other than the low pressure turbine 103 among these turbines is operated so that the steam circulating inside the turbine is maintained as dry steam without changing into humid steam. In this case, only the low pressure turbine 103 is operated so that the steam circulating inside the turbine changes from dry steam into humid steam. In this case, the humid steam is not present other than in the vicinity of the outlet of the low pressure turbine 103. As a result, a degradation of the turbine internal efficiency caused by moisture loss may be prevented, and the turbine cycle performance may be improved. Further, there is no possibility of generating of erosion in the high pressure turbine 101. Furthermore, the internal efficiency of each turbine may be specified.

As described above, in the embodiment, at least the two-stage reheat turbine is configured in the steam turbine plant using solar heat. Accordingly, the number of turbine stages of the high pressure turbine 101 in the axis direction of the turbine is smaller than that of the conventional high pressure turbine 101 so that the steam inside the high pressure turbine 101 may be prevented from changing from dry steam into humid steam. Further, the steam inside the turbine other than the low pressure turbine 103 may be prevented from changing from dry steam into humid steam. In the steam turbine cycle using solar heat, since the temperature of the high pressure turbine inlet steam 112 is lower than that of the steam turbine cycle using heat of combusted exhaust gas of fuel in many cases, there is a large merit that dry steam may be prevented from changing into humid steam.

In the embodiment, since the steam inside the high pressure turbine 101 (further, all turbines other than the low pressure turbine 103) is prevented from changing from dry steam into humid steam, a degradation of the turbine internal efficiency caused by moisture loss may be reduced so that the turbine cycle efficiency may be improved. Further, there is no possibility of generating of erosion in the high pressure turbine 101. Furthermore, the internal efficiency of each turbine may be specified.

Meanwhile, the steam turbine plant of the embodiment may include first to N-th (N is an integer of two or more) reheaters and reheat turbines. In this case, the steam is circulated to alternately pass the reheaters and the reheat turbines in such an order of the first reheater, the first reheat turbine, the second reheater, the second reheat turbine, . . . , the N-th reheater, and the N-th reheat turbine.

Hereinafter, a second embodiment of the invention will be described. The second embodiment is a modification of the first embodiment. Therefore, in the second embodiment, the differences from the first embodiment will be mainly described.

Second Embodiment

Figure 3:
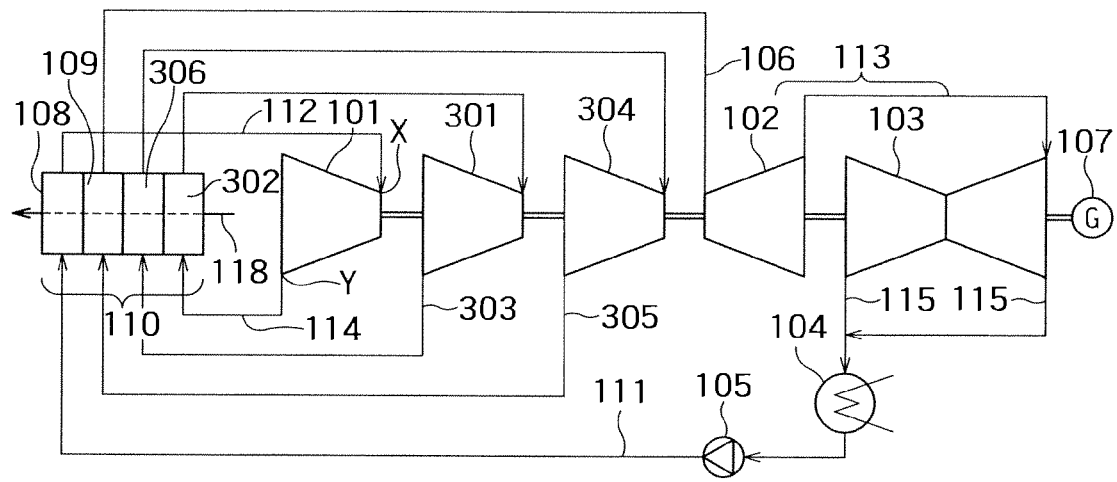
FIG. 3 is a schematic diagram illustrating a configuration of a steam turbine plant of a second embodiment.

FIG. 3 is a schematic diagram illustrating a configuration of a steam turbine plant of the second embodiment. As for the configuration shown in FIG. 3, the differences from the configuration shown in FIG. 1 or 5 will be mainly described.

In the embodiment, at least a three-stage reheating cycle is configured by using a steam turbine that is driven by steam generated by solar heat. In the embodiment, the reheating cycle is configured as a three-stage reheating cycle that includes the high pressure turbine 101 and the reheat turbines 301, 304, and 113. In the embodiment, the reheat turbine 301 is referred to as a first reheat turbine, the reheat turbine 304 is referred to as a second reheat turbine, and the reheat turbine 113 is referred to as a third reheat turbine. The intermediate pressure turbine 102 and the low pressure turbine 103 correspond to a continuous reheat turbine 113.

In the embodiment, for example, a difference between the temperature of the steam at the inlet of the high pressure turbine 101 as the turbine at the most upstream side and the saturation temperature of the pressure of the steam at the inlet of the high pressure turbine 101 is set to be 20° C. or less, and in this condition, at least the three-stage reheating cycle is configured. If the high pressure turbine inlet steam 112 is humid steam, the temperature of the steam at the inlet of the high pressure turbine 101 becomes a boiling point (condensing point) of the pressure of the steam at the inlet of the high pressure turbine 101 regardless of the humidity degree. The above-described condition may be applied in combination with the reheat regeneration cycle shown in FIG. 6.

In the steam turbine cycle of the related art or the first embodiment, the heating medium 118 such as oil is used. However, in the embodiment, a type that does not use the heating medium may be adopted, and herein, the case is described. In the embodiment, the water 111 fed from the pump 105 is directly hated by radiant heat of the solar ray 117 at the solar energy collector 119. In the embodiment, the heating medium 118 shown in FIG. 3 is replaced with the solar ray 117, and the heater 110 shown in FIG. 3 is replaced with the solar energy collector 119.

When the heating medium 118 is not used, the temperature of the high pressure turbine inlet steam 112 is lower than that of the case of using the heating medium 118, and the high pressure turbine inlet steam 112 is close to the humid region in the diagrammatic drawing of specific enthalpy-specific entropy. Therefore, in the case where the heating medium 118 is not used like the embodiment, at least the three-stage reheating cycle is adopted. In the embodiment, the rotation shafts of the high pressure turbine 101, the first reheat turbine 301, the second reheat turbine 304, the intermediate pressure turbine 102, and the low pressure turbine 103 rotated by the expanding steam are connected to the power generator 107, and power is generated in the power generator 107.

As described above, in FIG. 3, the heating medium 118 is replaced with the solar ray 117, and the heater 110 is replaced with the solar energy collector 119. The solar energy collector 119 includes the boiler 108 which changes the water 111 into the steam 112 by using radiant heat of the solar ray 117, the reheater (hereinafter, referred to as a "first reheater") 302 for the first reheat turbine 301, the reheater (hereinafter, referred to as a "second reheater") 306 for the second reheat turbine 304, and the reheater (hereinafter, referred to as a "third reheater") 109 for the third reheat turbine 113. In the boiler 108, the first reheater 302, the second reheater 306, and the third reheater 109, water or steam as a heating object is directly heated by the radiant heat. In FIG. 3, the symbol 303 denotes the first reheat turbine exhaust, and the symbol 305 denotes the second reheat turbine exhaust.

Meanwhile, in FIG. 3, the turbine located at the upstream side of the first reheater 302 is only one turbine (the high pressure turbine 101). However, a plurality of turbines may be disposed to be connected to each other in series at the upstream side of the first reheater 302, and the plurality of turbines connected to each other in series may constitute the high pressure turbine.

Further, in the case where a plurality of turbines is disposed to be connected to each other in series at the upstream of the first reheater 302, the turbine at the most upstream side among these turbines becomes the turbine at the most upstream side constituting the steam turbine plant of FIG. 3.

Figure 4:
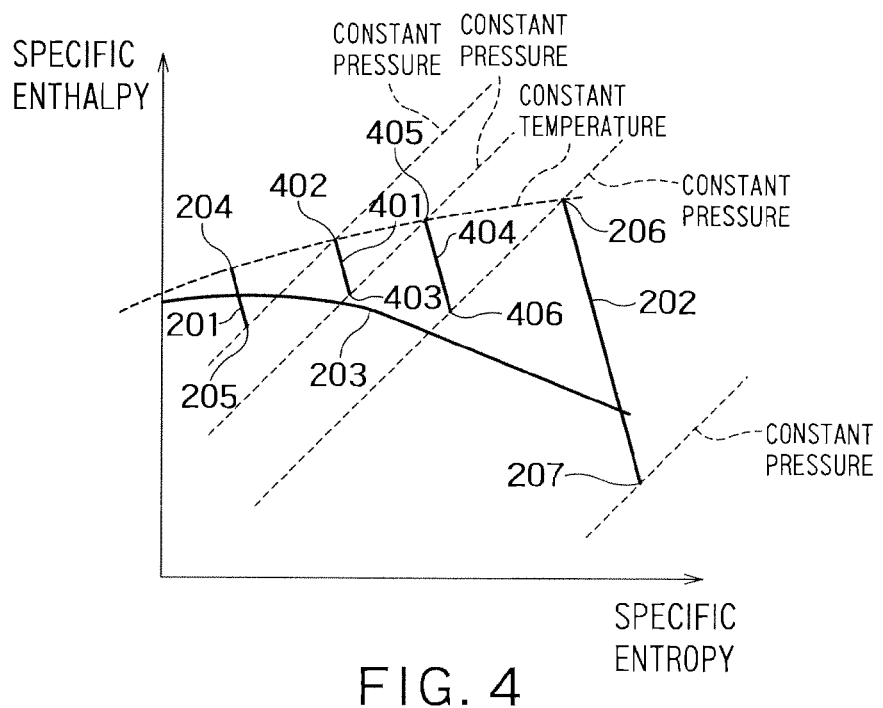
FIG. 4 is a diagram illustrating an example of an expansion line of the steam turbine plant shown in FIG. 3.

FIG. 4 is a diagram illustrating an example of the expansion line of the steam turbine plant shown in FIG. 3.

In FIG. 4, a second reheat turbine expansion line 404 changes from a second reheat turbine inlet point 405 to a second reheat turbine outlet point 406. Further, the high pressure turbine exhaust 114, the first reheat turbine exhaust 303, and the second reheat turbine exhaust 305 are respectively heated at the first reheater 302, the second reheater 306, and the third reheater 109 up to a temperature equal to the temperature of the high pressure turbine inlet steam 114.

In the embodiment, as well as the first embodiment, a steam turbine cycle may be realized in which the steam other than in the vicinity of the outlet of the low pressure turbine 103 is not humid steam. In FIG. 4, a high pressure turbine outlet point 205 is a humid region, but the first reheat turbine outlet point 403 and the second reheat turbine outlet point 406 are not humid regions. Since the number of turbine stages in which the steam becomes humid steam decreases in the entire turbine cycle, a degradation of the turbine internal efficiency caused by moisture loss may be suppressed as compared with the related art, and the turbine cycle performance may be improved. Even in this case, it is desirable that the reheat turbines 301, 304, and 113 are operated so that the steam circulating therein is maintained as dry steam.

In the embodiment, since the first reheat turbine outlet point 403 and the second reheat turbine outlet point 406 are set as dry regions, the number of turbine stages in which the steam inside the high pressure turbine 101 becomes humid steam decreases, and the number of turbine stages in which the steam becomes humid steam decreases in the entire turbine cycle. Accordingly, a degradation of the turbine internal efficiency caused by moisture loss is reduced, and the turbine cycle performance is improved. Further, the possibility of generating of erosion caused by minute water drops colliding with the surface of the turbine blade decreases. Since the single-stage reheating cycle is also configured as the multi-stage reheating cycle, the turbine cycle performance is improved. Meanwhile, one or both of the first reheat turbine outlet point 403 and the second reheat turbine outlet point 406 may be a humid region.

The technology of the embodiment may be applied to not only the steam turbine cycle using solar heat, but also the cycle in which the high pressure turbine inlet steam 112 is sufficiently close to the humid region in the diagrammatic drawing of specific enthalpy-specific entropy. Therefore, the steam turbine may be configured as a turbine using a combusted exhaust gas as a heat source or a nuclear turbine, and the same effect as that of the case of using solar heat may be obtained.

Meanwhile, in the nuclear turbine, the flow of the heating medium 118 in the heater 110 is different from the flow shown in FIG. 5 in many points.

Hereinafter, various modifications of the embodiment will be described.

(Trough Condensing Type Solar Energy Collector)

In the embodiment, as the solar energy collector 119 (refer to FIG. 5), for example, the trough condensing type shown in FIG. 8 is used. The configuration thereof is the same as that of the first embodiment. In this case, the trough condensing type solar energy collector 119 may be used in combination with the reheat regeneration cycle shown in FIG. 6.

(High Pressure Turbine Inlet Steam Condition)

In the embodiment, for example, the steam at the inlet of the high pressure turbine 101 as the turbine at the most upstream side has a pressure of 20 ata or more and a temperature of 300° C. or less, and in this condition, at least the three-stage reheating cycle is configured. In the case where the steam at the inlet of the high pressure turbine 101 has a pressure of 20 ata or more and a temperature of 300° C. or less, the temperature of the high pressure turbine inlet steam 112 is low, and the high pressure turbine inlet steam 112 is close to the humid region in the diagrammatic drawing of specific enthalpy-specific entropy. If the high pressure turbine inlet steam 112 is humid steam, the temperature of the steam at the inlet of the high pressure turbine 101 becomes a boiling point (condensing point) of the pressure of the steam at the inlet of the high pressure turbine 101 regardless of the humidity degree. The above-described condition may be applied in combination with the reheat regeneration cycle shown in FIG. 6.

The above-described condition may be applied to not only the steam turbine cycle using solar heat, but also the cycle in which the high pressure turbine inlet steam 112 is sufficiently close to the humid region in the diagrammatic drawing of specific enthalpy-specific entropy. Therefore, the turbine may be configured as a turbine using a combusted exhaust gas as a heat source or a nuclear turbine, and the same effect as that of the case of using solar heat may be obtained.

Meanwhile, in the nuclear turbine, the flow of the heating medium 118 in the heater 110 is different from the flow shown in FIG. 5 in many ways.

As described above, in the embodiment, at least the three-stage reheat turbine is configured in the steam turbine plant using solar heat. Accordingly, even in the case where the temperature of the high pressure turbine inlet steam 112 is low, a degradation of the turbine internal efficiency caused by moisture loss may be suppressed as compared with the related art, and the turbine cycle performance may be improved. Further, the possibility of generating of erosion in the high pressure turbine 101 decreases.

Meanwhile, in the steam turbine plant of the embodiment, the first to the M-th (M is an integer of three or more) reheaters and the reheat turbines may be provided. In this case, the steam is circulated to alternately pass the reheaters and the reheat turbines in such an order of the first reheater, the first reheat turbine, the second reheater, the second reheat turbine, . . . , the M-th reheater, and the M-th reheat turbine.

Further, in the embodiment, the turbine other than the low pressure turbine 103 among the entire turbines constituting the steam turbine plant may be operated so that the steam circulating inside the turbine is maintained as dry steam. In this case, the humid steam is not present other than in the vicinity of the outlet of the low pressure turbine 103. As a result, a degradation of the turbine internal efficiency caused by moisture loss may be further prevented, and the turbine cycle performance may be further improved.

As described above, according to the embodiment of the invention, the steam turbine plant is provided which is capable of preventing a degradation of the turbine internal efficiency caused by moisture loss and improving the turbine cycle performance.

While examples of specific aspects of the invention have been explained with reference to the first and second embodiments, the invention is not limited to those embodiments.

The invention claimed is:

1. A steam turbine plant comprising:
a solar energy collector configured to collect solar heat;
a boiler;
a steam as a working fluid, the boiler configured to change water into the steam using the solar heat;
a high pressure turbine including a turbine or turbines connected to each other in series, and configured to be driven by the steam from the boiler;
first to N-th reheaters, where N is an integer of two or more; and
first to N-th reheat turbines,
wherein
the first reheater is configured to heat the steam exhausted from the high pressure turbine using the solar heat, and the first reheat turbine is configured to be driven by the steam from the first reheater,
a second to the N-th reheaters are configured to heat the steam exhausted from the first to (N−1)-th reheat turbines using the solar heat, respectively, and a second to the N-th reheat turbines are configured to be driven by the steam from the second to the N-th reheaters, respectively,
the steam inside of a reheat turbine other than the N-th reheat turbine among the first to N-th reheat turbines is maintained as dry steam,
the steam inside the N-th reheat turbine is changed from dry steam to humid steam, and
the steam inside the high pressure turbine is maintained as dry steam.

2. The plant of claim 1, wherein
the solar energy collector is a trough condensing solar energy collector.

3. The plant of claim 1, wherein
a difference between an inlet steam temperature of a turbine located at a most upstream among all of the turbines of the steam turbine plant and a saturation temperature under an inlet steam pressure of the most upstream turbine is 100° C. or less.

4. The plant of claim 1, wherein
an inlet steam of a turbine located at a most upstream among all of the turbines of the steam turbine plant has a pressure of 20 ata or more and a temperature of 420° C. or less.

5. The plant of claim 1, wherein
N is an integer of three or more, and
a difference between an inlet steam temperature of a turbine located at a most upstream among all of the turbines of the steam turbine plant and a saturation temperature under an inlet steam pressure of the most upstream turbine is 20° C. or less.

6. The plant of claim 1, wherein
N is an integer of three or more, and
an inlet steam of a turbine located at a most upstream among all of the turbines of the steam turbine plant has a pressure of 20 ata or more and a temperature of 300° C. or less.

* * * * *